United States Patent
Kraft

(10) Patent No.: US 8,890,421 B2
(45) Date of Patent: Nov. 18, 2014

(54) LINE VOLTAGE CONTROL CIRCUIT FOR A MULTI-STRING LED DRIVE SYSTEM

(71) Applicant: Analog Devices, Inc., Norwood, MA (US)

(72) Inventor: Jonathan Kraft, Frederick, CO (US)

(73) Assignee: Analog Devices, Inc., Norwood, MA (US)

( * ) Notice: Subject to any disclaimer, the term of this patent is extended or adjusted under 35 U.S.C. 154(b) by 25 days.

(21) Appl. No.: 13/760,881

(22) Filed: Feb. 6, 2013

(65) Prior Publication Data

US 2014/0015425 A1 Jan. 16, 2014

Related U.S. Application Data

(60) Provisional application No. 61/670,458, filed on Jul. 11, 2012.

(51) Int. Cl.
| | |
|---|---|
| *H05B 37/00* | (2006.01) |
| *H05B 39/00* | (2006.01) |
| *H05B 41/00* | (2006.01) |
| *H01J 7/44* | (2006.01) |
| *H01J 13/46* | (2006.01) |
| *H01J 17/34* | (2006.01) |
| *H01J 19/78* | (2006.01) |
| *H01J 23/16* | (2006.01) |
| *H05B 33/08* | (2006.01) |
| *H05B 37/02* | (2006.01) |

(52) U.S. Cl.
CPC ........ *H05B 33/0809* (2013.01); *H05B 33/0815* (2013.01); *H05B 33/0884* (2013.01); *H05B 37/02* (2013.01); *H05B 33/0836* (2013.01); *H05B 33/0827* (2013.01)

USPC .............................. 315/185 R; 315/66; 314/8

(58) Field of Classification Search
CPC ........... H05B 33/0803; H05B 33/0828; H05B 41/232; H05B 41/19; F21Y 2101/02; H01T 4/16; H01T 1/04; H01T 4/20
USPC ................. 315/185 R, 36, 49, 66, 256; 314/8
See application file for complete search history.

(56) References Cited

U.S. PATENT DOCUMENTS

| | | | | |
|---|---|---|---|---|
| 2007/0114951 | A1* | 5/2007 | Tsen et al. | 315/291 |
| 2008/0094008 | A1* | 4/2008 | Liu | 315/294 |
| 2010/0072922 | A1* | 3/2010 | Szczeszynski et al. | 315/297 |
| 2011/0012519 | A1* | 1/2011 | Zhao | 315/185 R |
| 2011/0148323 | A1* | 6/2011 | Yao et al. | 315/295 |
| 2011/0234122 | A1* | 9/2011 | Yu et al. | 315/297 |

(Continued)

*Primary Examiner* — Dylan White
(74) *Attorney, Agent, or Firm* — Schwegman Lundberg & Woessner, P.A.

(57) ABSTRACT

A line voltage control circuit for use with a multi-string LED drive system which provides a common line voltage for multiple LED strings that are connected to respective current sink circuits at respective junctions. An error amplifier receives the minimum junction voltage and a reference 'desired junction voltage' at respective inputs, and a voltage regulator outputs the line voltage in response to a voltage applied to a feedback input. A comparator toggles an output when the maximum junction voltage ($V_{max}$) exceeds a reference limit ($V_{limit}$). A multiplexer receives the error amplifier output and a fixed voltage at respective inputs and provides one of the signals to the regulator's feedback input in response to the comparator output. When $V_{max} > V_{limit}$, the fixed voltage is provided to the feedback input and the line voltage is reduced, thereby protecting low voltage current sinks from potentially damaging high voltages.

10 Claims, 3 Drawing Sheets

(56) References Cited

U.S. PATENT DOCUMENTS

| | | | |
|---|---|---|---|
| 2012/0181939 A1* | 7/2012 | Szczeszynski et al. | 315/186 |
| 2012/0326613 A1* | 12/2012 | Liu | 315/185 R |
| 2013/0147360 A1* | 6/2013 | Kang | 315/122 |
| 2014/0015427 A1* | 1/2014 | Sagen et al. | 315/186 |
| 2014/0125236 A1* | 5/2014 | Szczeszynski et al. | 315/186 |

* cited by examiner

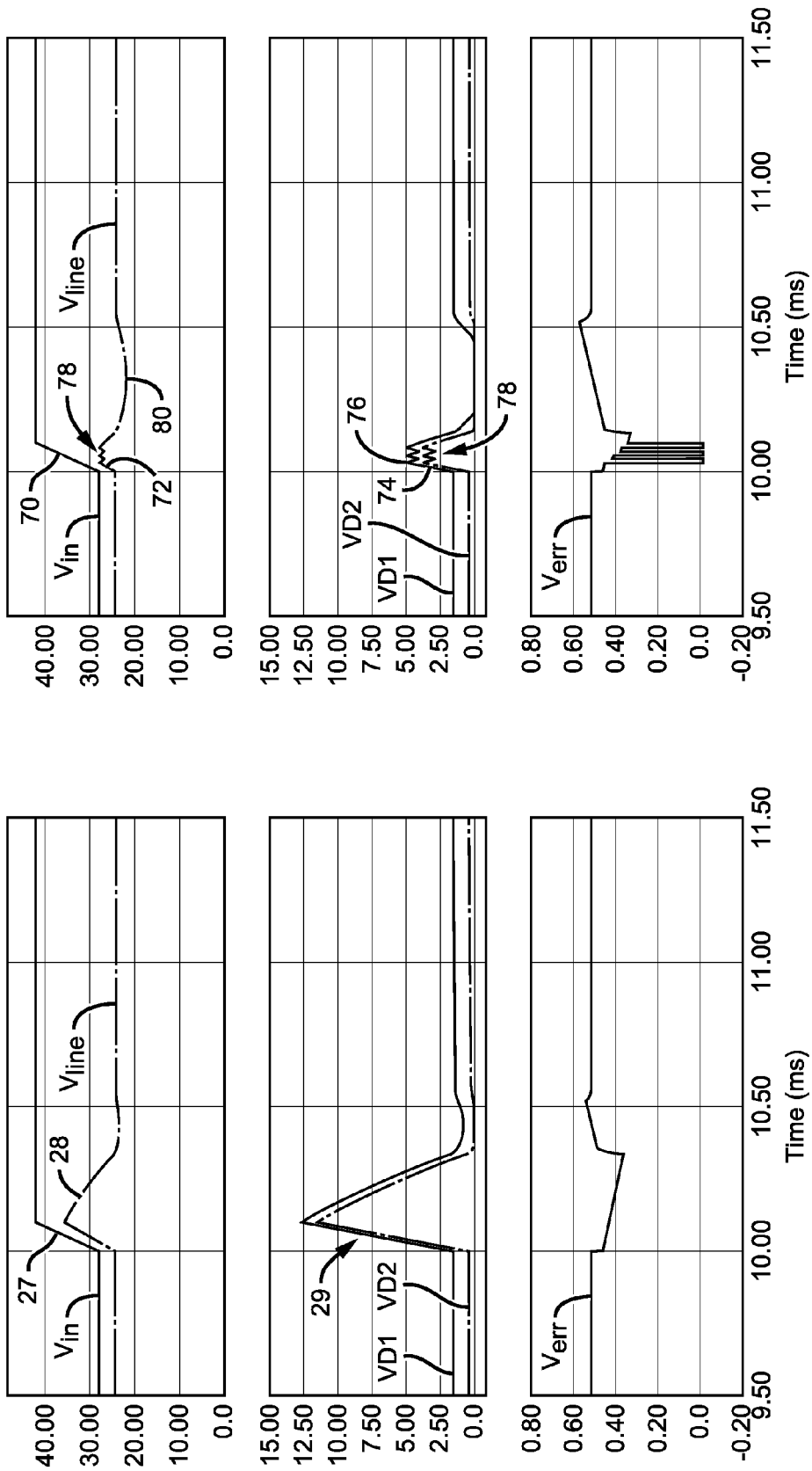

LINE VOLTAGE CONTROL CIRCUIT FOR A MULTI-STRING LED DRIVE SYSTEM

RELATED APPLICATIONS

This application claims the benefit of provisional patent application No. 61/670,458 to Kraft et al., filed Jul. 11, 2012.

BACKGROUND OF THE INVENTION

1. Field of the Invention

This invention relates generally to series/parallel LED drive systems, and more particularly to techniques designed to protect low voltage current sinks that might be used with such systems.

2. Description of the Related Art

LED lighting strategies may employ LEDs driven in series, parallel, or both. LEDs driven in series by definition all share the same current. If all LEDs share the same current, ideally the brightness of the LEDs will be matched. Some applications require a number of LEDs to be driven with matched brightness, and so connecting the LEDs in series accomplishes the task. A problem can arise, however, if a very large number of LEDs must be driven in series. The series-connected LEDs are powered by a line voltage necessary to provide the necessary current; however, finding line regulators able to support the large line voltage needed for a high LED count series string may be difficult or cost prohibitive.

LEDs may also be arranged in parallel-connected 'strings', each of which is driven by a current source or (most commonly) a current sink circuit. But brightness matching between the parallel-connected LEDs is limited by the imperfect matching of the drive circuits, which can vary widely depending on the choice of sink implementation. A parallel LED configuration does have the advantage of typically requiring a lower line voltage than does a series configuration, which may be a benefit in some applications. Also, in some applications LEDs are connected in parallel because different currents need to be driven through the LEDs.

Due to the issues noted above, the best approach may be a compromise between the series and parallel solutions: a "series/parallel" solution. Note that a series/parallel solution could in principle be implemented by simply taking the series approach discussed above and creating multiple copies of this solution. However, this cut and paste approach adds cost to the overall solution because of the need for separate line regulators for each string (or "channel"). In some cases a single integrated circuit (IC) with multiple regulator channels may be able to take the place of multiple regulators, but for a number of solutions an appropriate multiple output regulator may not exist or may still be cost prohibitive due to the number of non-regulator external components required.

A cost effective compromise employing a series/parallel solution is shown in FIG. 1a. Here, each series LED string 10, 12, 14 has its own independent current sink circuit 16, 18, 20, but all series strings share a common line voltage $V_{line}$, which is provided by a voltage regulator 22. The voltage on the current sink circuits (VD0, VD1, VD2) is generally set to be equal to the maximum voltage that a string of LEDs might have on its anode connection. This can be arranged by means of a "minimum" circuit 24, which receives the voltages on each of the current sinks and outputs the minimum voltage of the group. An error amplifier 26 receives the minimum voltage and a reference voltage $VD_{desired}$ at respective inputs, and provides an output $V_{err}$ to the feedback input of voltage regulator 22 such that the current sink circuit with the minimum VD voltage operates at a desired target voltage equal to $VD_{desired}$. This arrangement may result in voltages VD0, VD1 and VD2 being relatively high, necessitating the use of current sinks with a high voltage rating. However, high voltage current sinks are quite costly in terms of silicon die area.

High power zener diodes might be employed to clamp the voltages on each current sink circuit and thereby prevent them from exceeding a safe level. However, this can create high currents through the LEDs which may damage them or reduce their lifetimes.

High voltages on current sink circuits 16, 18 and 20 may also occur if the output of voltage regulator 22 is subjected to a sudden line or load change. In this case, it may take error amplifier 26 a relatively long time to adjust the power delivery. During this time, voltages VD0, VD1 and VD2 may rise to levels that can damage current sink circuits 16, 18 and 20, especially if low cost low voltage current sink circuits are used. This is illustrated in FIG. 1b. A step increase 27 in the Vin supply voltage provided to voltage regulator 22 causes a spike 28 in $V_{line}$, which results in corresponding spikes 29 in the VD voltages (VD1 and VD2 shown). Error amplifier output $V_{err}$ begins to compensate, but not before VD1 and VD2 rise to nearly 12.5V. If current sinks 16, 18, 20 had a maximum voltage rating of 6V, it is likely that significant damage would have been done.

SUMMARY OF THE INVENTION

A line voltage control circuit for a multi-string LED drive system is presented which addresses the problems discussed above.

The present line voltage control circuit is for use with a multi-string LED drive system which provides a common line voltage for two or more LED strings that are connected in series with respective current sink circuits at respective junctions, with each of the current sink circuits arranged to cause a desired current to be conducted by the LED string to which it is connected. The LED drive system would typically include an error amplifier which receives a voltage representing the voltage at one of the junctions and a reference 'desired junction voltage' at respective inputs, and which outputs a voltage that varies with the difference between its inputs. The drive system also typically includes a voltage regulator which outputs the common line voltage, and is arranged to output the line voltage in response to a voltage applied to a feedback input.

The present line voltage control circuit includes a minimum/maximum ('min/max') circuit which receives the voltages at each of the junctions at respective inputs, and which outputs a 'maximum' voltage which is proportional to the greatest of the received voltages and a 'minimum' voltage which is proportional to the least of the received voltages. A comparator receives the 'maximum' voltage and a reference limit voltage at respective inputs and produces an output which toggles when the 'maximum' voltage exceeds the reference limit voltage. The present circuit also includes a multiplexer which receives the output of the error amplifier at a first input and a fixed voltage at a second input and provides one of the signals at the first and second inputs at an output in response to a select signal which is provided by the comparator output. The multiplexer output is provided to the feedback input of the voltage regulator.

The line voltage control circuit is arranged such that when the 'maximum' voltage is less than the reference limit voltage, the common line voltage is set such that the 'minimum' voltage is approximately equal to the reference desired junction voltage. The circuit is further arranged such that when the 'maximum' voltage is greater than the reference limit voltage, the fixed voltage is provided to the feedback input, with the line voltage control circuit arranged such that the common line voltage is reduced when the fixed voltage is provided to the feedback input. When so arranged, multiple LED strings can be safely used with low voltage current sinks, while being powered from a much greater voltage.

These and other features, aspects, and advantages of the present invention will become better understood with reference to the following description and claims.

BRIEF DESCRIPTION OF THE DRAWINGS

FIG. 1b is a timing diagram for the LED drive system of FIG. 1a.

FIG. 2c is timing diagram for the multi-string LED drive system with line voltage control circuit shown in FIG. 2a.

DETAILED DESCRIPTION OF THE INVENTION

Figure 2A:
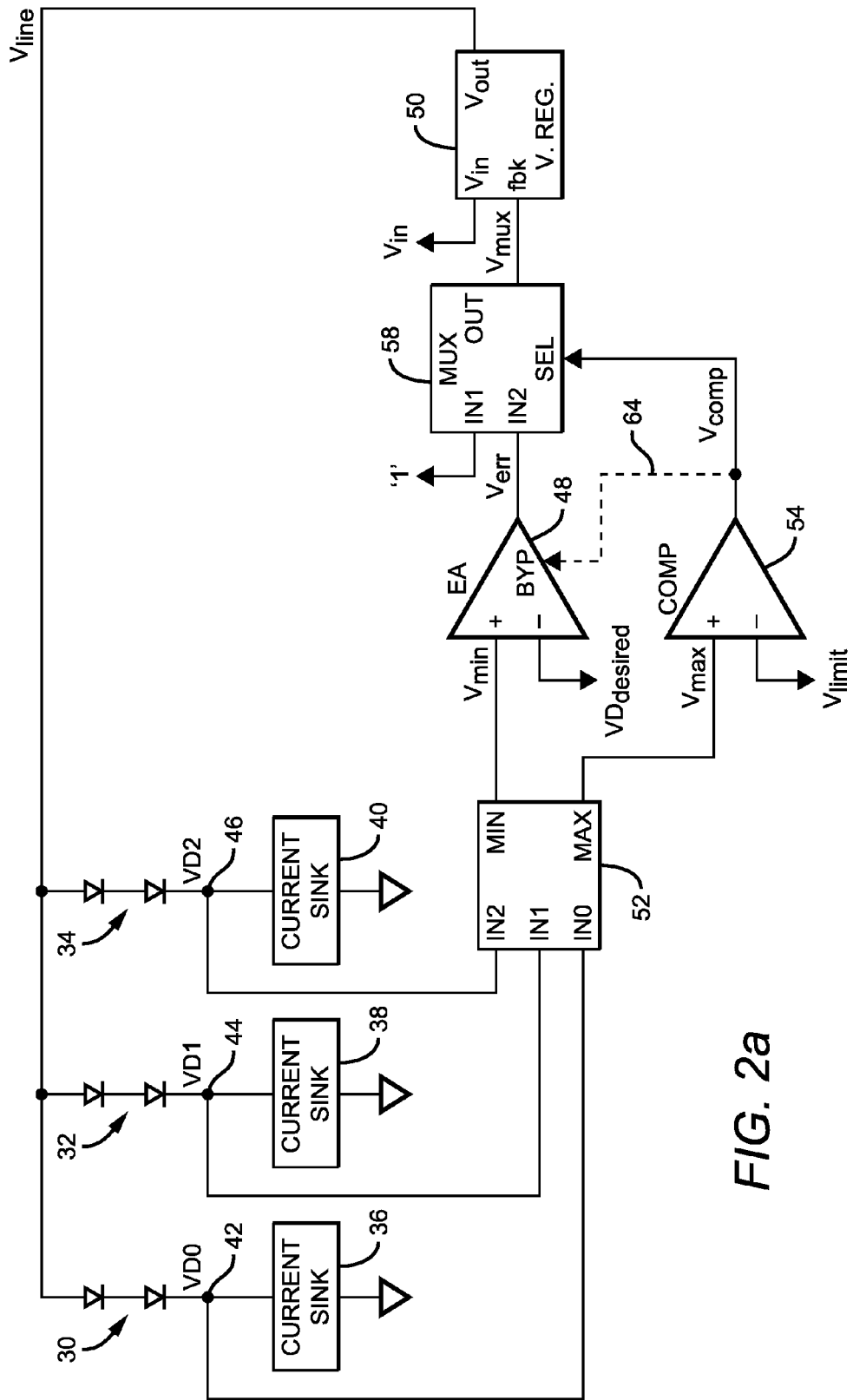
FIG. 2a is a schematic diagram of one possible embodiment of a multi-string LED drive system which employs the present line voltage control circuit.

The present line voltage control circuit is for use with a multi-string LED drive system; an exemplary embodiment is illustrated in FIG. 2a. The circuit requires an arrangement in which a common line voltage ($V_{line}$) is provided to two or more LED strings (30, 32, 34) that are connected in series with respective current sink circuits (36, 38, 40) at respective junctions (42, 44, 46). Each current sink circuit is arranged to cause a desired current to be conducted by the LED string to which it is connected. Note that though the described and illustrated embodiments employ current sink circuits to conduct the LED string currents, the present line voltage control circuit is equally applicable to an LED drive system employing current source circuits.

The LED drive system includes an error amplifier 48, which receives a voltage representing the voltage at one of junctions 42, 44, 46 and a reference 'desired junction voltage' ($VD_{desired}$) at respective inputs and which outputs a voltage $V_{err}$ that varies with the difference between its inputs. The drive system also includes a voltage regulator 50 which is powered by a supply voltage Vin and outputs common line voltage $V_{line}$, and is arranged to vary $V_{line}$ in response to a voltage applied to a feedback input ('fbk'). It is well-understood that in practice, error amplifier 48 is likely to include additional components which provide, for example, frequency compensation, optical coupling, etc. Also note that voltage regulator 50 could be implemented in many different ways and with many different regulator chips, as long as the regulator is arranged to vary its output voltage in response to a voltage applied to an input such as 'fbk' shown in FIG. 2a. Numerous voltage regulator ICs can be obtained that provide this functionality. Typically, these ICs require only a few external resistors, inductors, and/or capacitors for a fully functioning regulator design. ICs also exist that provide only the control system and reference, with the power train to be assembled by the user.

The present line voltage control circuit interfaces with the current sinks, error amplifier and voltage regulator of the LED drive system to protect the current sinks from being subjected to unacceptably high voltages. The line voltage control circuit includes a min/max circuit 52 which receives the voltages (VD0, VD1, VD2) at each of junctions 42, 44, 46 at respective inputs (IN0, IN1, IN2), and which outputs a 'maximum' voltage $V_{max}$ which is proportional to (preferably equal to) the greatest of the received voltages and a 'minimum' voltage $V_{min}$ which is proportional to (preferably equal to) the least of the received voltages.

Maximum voltage $V_{max}$ and a reference limit voltage $V_{limit}$ are provided to the inputs of a comparator 54, which produces an output $V_{comp}$ that toggles when said $V_{max} > V_{comp}$ is provided to the 'select' input of a multiplexer 58, which receives a fixed voltage (such as a logic '1' or '0'; a logic '1' is shown in FIG. 2a) at a first input (IN1) and the output $V_{err}$ of error amplifier 48 at a second input. One of the signals at IN1 and IN2 is provided at the multiplexer's output ($V_{mux}$) in response to the select signal, and $V_{mux}$ is provided to the feedback input of voltage regulator 50. When so arranged, min/max circuit 52, error amplifier 48, and voltage regulator 50 form a line voltage control loop which, in normal operation, operates to regulate at least one of the voltages at junctions 42, 44, 46.

In operation, when $V_{max} < V_{limit}$, the line voltage control loop is regulated normally: signal $V_{comp}$ causes mux 58 to provide the error voltage $V_{err}$ to the feedback input of voltage regulator 50, which results in the common line voltage $V_{line}$ being adjusted as needed to make the 'minimum' VD voltage approximately equal to $VD_{desired}$.

However, when $V_{max} > V_{limit}$, indicating that at least one of the VD voltages is unacceptably high, signal $V_{comp}$ causes mux 58 to provide the fixed voltage (logic '1') to the feedback input of voltage regulator 50. Regulator 50 is arranged to reduce common line voltage $V_{line}$ when the fixed voltage is applied to its feedback input. The line voltage control circuit is preferably arranged such that, if $V_{max}$ falls back below $V_{limit}$, the line voltage automatically recovers and normal regulation of the control loop resumes. In this way, low voltage current sinks may be employed in an LED drive system, with the present line voltage control circuit operating to protect them from unacceptably high voltages.

The current sink circuits will typically have an associated maximum voltage rating. The present line voltage control circuit is preferably arranged such that $V_{limit}$ is equal to or less than the maximum voltage rating, such that the line voltage control circuit prevents the current sink circuits from being subjected to voltages in excess of their maximum voltage rating.

Figures 1A, 2B:
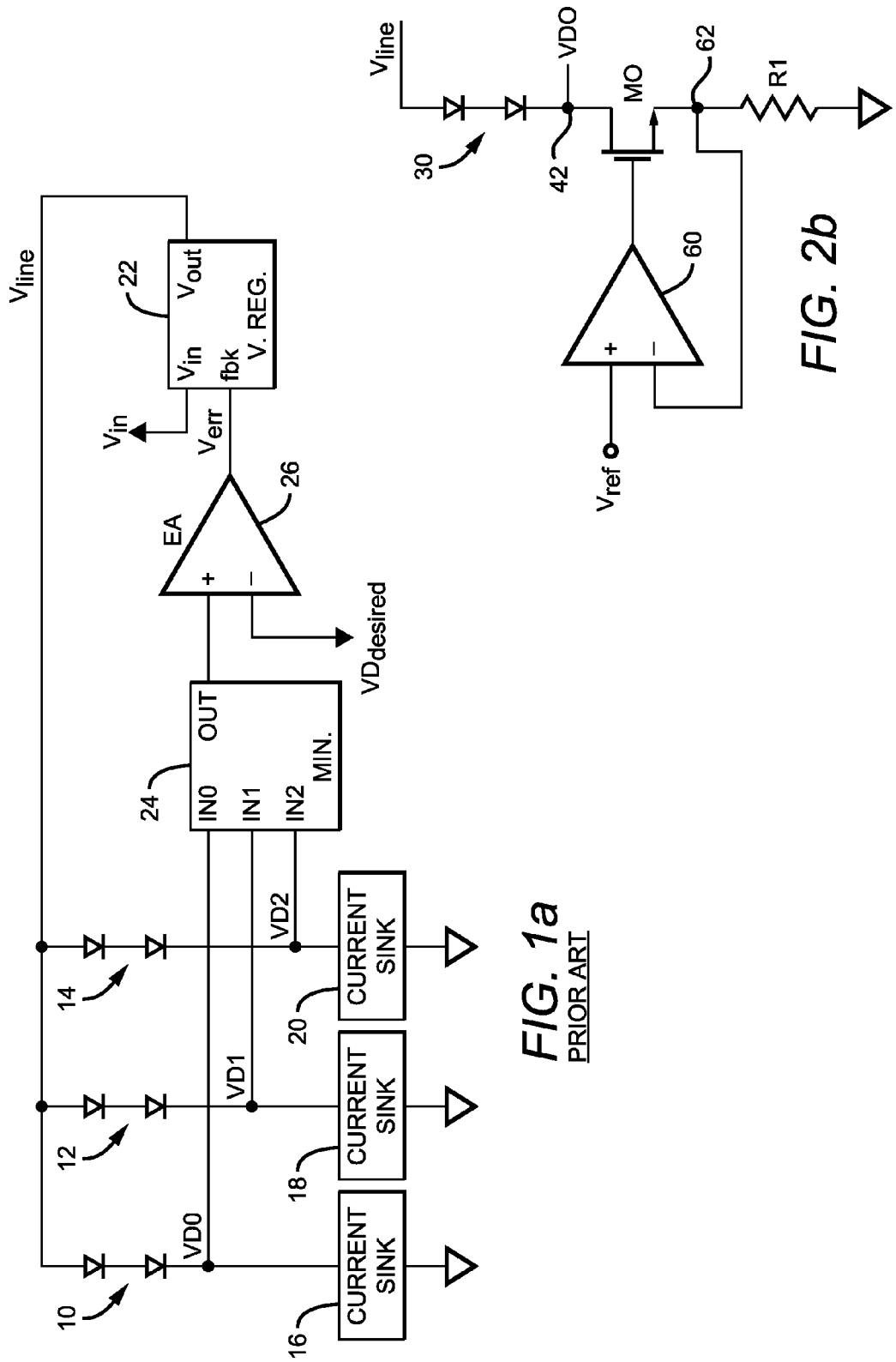
FIG. 1a is a schematic diagram of a known LED drive system.
FIG. 2b is a schematic diagram of one possible embodiment of a current sink circuit.

One possible implementation of a current sink circuit as might be used with an LED drive system with a line voltage control circuit such as that shown in FIG. 2a is shown in FIG. 2b. The exemplary current sink circuit includes a transistor M0 connected in series with a respective one of the LED strings (here, string 30) and is arranged to cause a desired LED string current to be conducted when a sufficient voltage is applied to the transistor's control input (here, the gate of an NMOS FET). The current sink circuit also includes a resistance R1 connected between M0 and a circuit common point, and an amplifier 60 which receives a reference voltage $V_{ref}$ at a first input and the voltage at the junction 62 of R1 and M0 at a second input. Amplifier 60 and M0 form a local current loop arranged to provide a voltage to M0's gate needed to force the voltage at junction 62 to be approximately equal to $V_{ref}$, which is selected such that a desired LED string current is conducted by R1. Note that the current sink circuit shown in FIG. 2b is merely one possible implementation; there are numerous ways in which a current sink or current source circuit could be realized and employed as part of an LED drive system as discussed herein.

An optional feature may be employed to reduce line voltage $V_{line}$ even more quickly when $V_{max} > V_{limit}$. Here, the error amplifier includes a 'bypass' input and is arranged such that its output is forced to a known voltage—typically zero— when the 'bypass' input is toggled. The error amplifier and voltage regulator are then arranged such that $V_{line}$, is quickly reduced when the error amplifier outputs the known voltage.

In practice, the comparator output would typically be coupled (64) to the error amplifier's 'bypass' input, and the line voltage control circuit would be arranged such that the error amplifier outputs the known voltage when $V_{max} > V_{limit}$. This is illustrated in FIG. 2a: error amplifier 48 has a bypass input 'BYP', to which comparator output $V_{comp}$ is connected. Amplifier 48 is arranged such that, when $V_{comp}$ toggles to indicate that $V_{max} > V_{limit}$, the amplifier outputs the known voltage. One way in which this might be implemented is as follows: an error amplifier often contains a capacitor, and is arranged such that its output voltage depends at least in part on the voltage across the capacitor. The amplifier may be arranged such that the voltage across the capacitor is reset to zero when the bypass input is toggled, which results in the amplifier's output going to the known voltage. This feature may be particularly beneficial when $V_{max}$ falls below $V_{limit}$, which would normally cause line voltage $V_{line}$ to be fully restored. However, this sudden increase in $V_{line}$ might again cause $V_{max}$ to reach or exceed $V_{limit}$ and thus trip the current sink protection mechanism. Here, however, with the output of error amplifier 48 reduced, the line voltage comes up at a reduced level—making it less likely to cause $V_{max}$ to exceed $V_{limit}$ immediately.

The operation of an LED drive system with a line voltage control circuit such as that shown in FIG. 2a is illustrated in FIG. 2c. A step increase 70 in the Vin supply voltage provided to voltage regulator 50 causes a spike 72 in $V_{line}$, which results in corresponding spikes 74 in the VD voltages (VD1 and VD2 shown). However, when the maximum VD voltage (here, VD1) reaches the limit (76) represented by voltage $V_{limit}$ (here, 5 volts), multiplexer 58 routes the fixed voltage at its input Ni to its output and to voltage regulator 50, causing $V_{line}$ and thus VD1 and VD2 to fall. This causes $V_{max}$ to fall below $V_{line}$, allowing $V_{line}$ and thus VD1 and VD2 to increase. If Vin remains high, it is likely that $V_{line}$, VD1 and VD2 will toggle up and down (78) at or below $V_{limit}$ until enough time has elapsed to allow the output $V_{err}$ of error amplifier 48 to properly adjust $V_{line}$ in view of the higher Vin voltage. Due to the action of the present line voltage control circuit, at no time do the junction voltages increase above 5 volts, thereby protecting current sink circuits 36, 38, 40 from possible damage.

Note that the system operation illustrated in FIG. 2c includes the use of an error amplifier 'bypass' input as described above. With reference to the $V_{err}$ trace, each time that VD1 reaches the 5 volt $V_{limit}$ value, $V_{err}$ is pulled down to zero. This causes $V_{line}$ and thus VD1 and VD2 to be reduced more quickly, as well as making $V_{line}$ come back up at a reduced level (80).

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A line voltage control circuit for a multi-string LED drive system which provides a common line voltage for two or more LED strings that are connected in series with respective current sink circuits at respective junctions, each of said current sink circuits arranged to cause a desired current to be conducted by the LED string to which it is connected, said drive system including an error amplifier which receives a voltage representing the voltage at one of said junctions and a reference desired junction voltage at respective inputs and which outputs a voltage that varies with the difference between said inputs, and a voltage regulator which outputs said common line voltage and is arranged to vary said line voltage in response to a voltage applied to a feedback input, said line voltage control circuit comprising:

a minimum and maximum (min/max) circuit which receives the voltages at each of said junctions at respective inputs and which outputs a maximum voltage which is proportional to the greatest of the received voltages and a minimum voltage which is proportional to the least of the received voltages;

a comparator which receives said maximum voltage and a reference limit voltage at respective inputs and which produces an output which toggles when said maximum voltage exceeds said reference limit voltage;

a multiplexer which receives the output of said error amplifier at a first input and a fixed voltage at a second input and which provides one of the signals at said first and second inputs at an output in response to a select signal, said comparator output providing said select signal and said multiplexer output provided to said voltage regulator's feedback input;

such that when said maximum voltage is less than said reference limit voltage, said line voltage control circuit provides said common line voltage such that said minimum voltage is approximately equal to said reference desired junction voltage, and such that when said maximum voltage is greater than said reference limit voltage, said fixed voltage is provided to said feedback input, said line voltage control circuit arranged such that said common line voltage is reduced when said fixed voltage is provided to said feedback input.

2. The line voltage control circuit of claim 1, wherein at least one of said LED strings comprises two or more LEDs connected in series.

3. The line voltage control circuit of claim 1, wherein each of said current sink circuits includes a transistor connected in series with a respective one of said LED strings and is arranged to cause a desired LED string current to be conducted when a sufficient voltage is applied to said transistor's control input, the nodes between the anodes of said LED strings and said transistors being said junctions.

4. The line voltage control circuit of claim 3, wherein each of said current sink circuits comprises:

a resistance connected between said transistor and a circuit common point; and an amplifier which receives a reference voltage at a first input and the voltage at the junction of said resistance and said transistor at a second input, said amplifier and transistor forming a local current loop arranged to provide a voltage to said transistor's control input needed to force the voltage at said junction of said resistance and said transistor to be approximately equal to said reference voltage.

5. The line voltage control circuit of claim 4, wherein said reference voltage is selected such that said desired LED string current is conducted by said resistance.

6. The line voltage control circuit of claim 1, wherein said min/max circuit is arranged such that said maximum voltage is approximately equal to the greatest of said received junction voltages and said minimum voltage is approximately equal to the least of said received junction voltages.

7. The line voltage control circuit of claim 1, wherein said error amplifier includes a bypass input and is arranged such that its output is forced to a known voltage when said bypass input is toggled, said error amplifier and said voltage regulator arranged such that said common line voltage is reduced when said error amplifier outputs said known voltage.

8. The line voltage control circuit of claim 7, wherein said comparator output is coupled to said bypass input, said line voltage control circuit arranged such that said error amplifier outputs said known voltage when said maximum voltage exceeds the reference limit voltage applied to said comparator.

9. The line voltage control circuit of claim 7, wherein said error amplifier includes a capacitor and is arranged such that its output voltage depends at least in part on the voltage across said capacitor, said error amplifier arranged such that the voltage across said capacitor is reset to zero when said bypass input is toggled.

10. The line voltage control circuit of claim 1, said current sink circuits having an associated maximum voltage rating, said system arranged such that said reference limit voltage is equal to or less than said maximum voltage rating, such that said line voltage control circuit prevents said current sink circuits from being subjected to voltages in excess of said maximum voltage rating.

* * * * *